Nov. 13, 1923.
P. A. MYERS
1,473,861
POWER HEAD
Filed Sept. 1, 1921
2 Sheets-Sheet 2
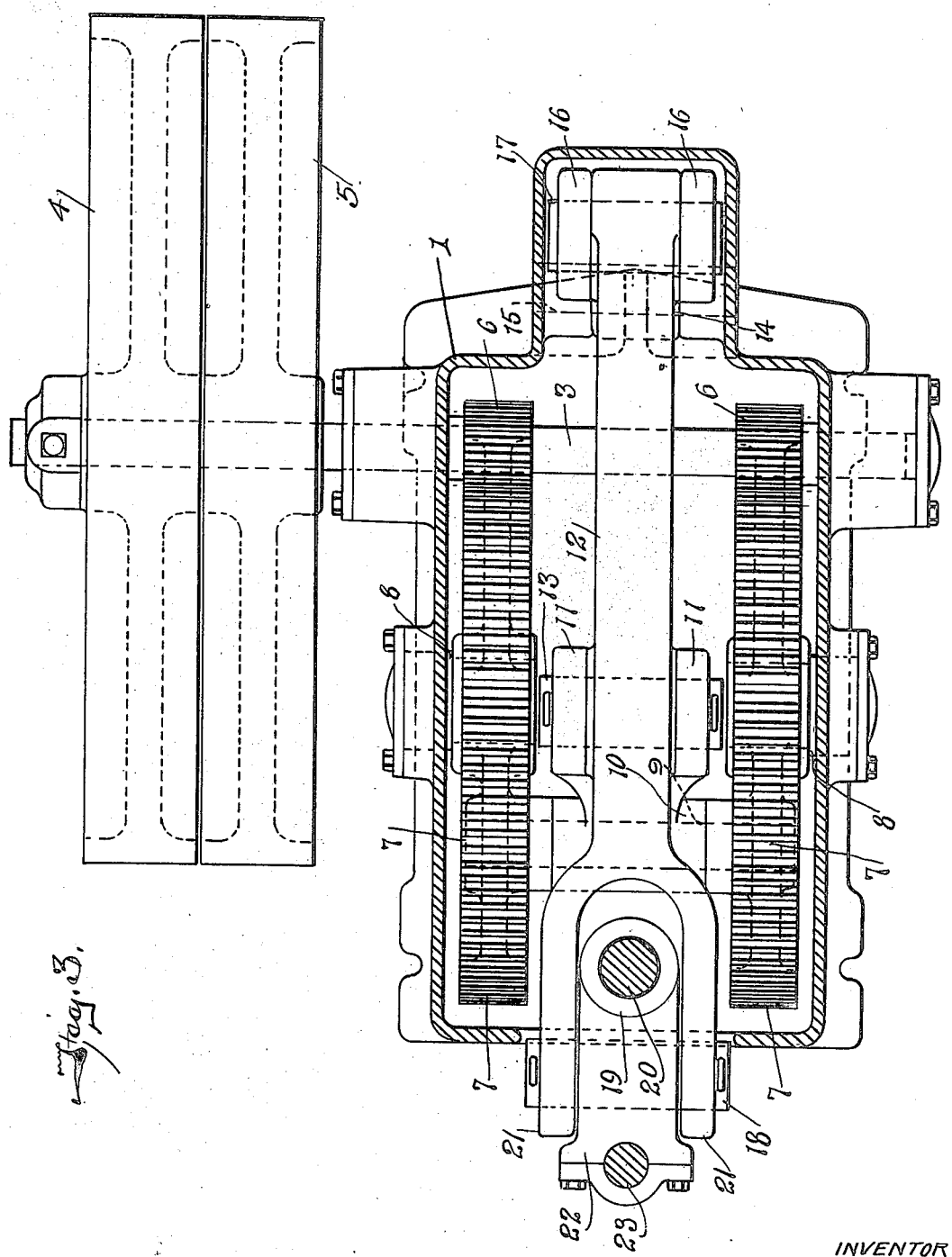
INVENTOR
Philip A. Myers
BY
Toulmin & Toulmin,
ATTORNEYS Patented Nov. 13, 1923.

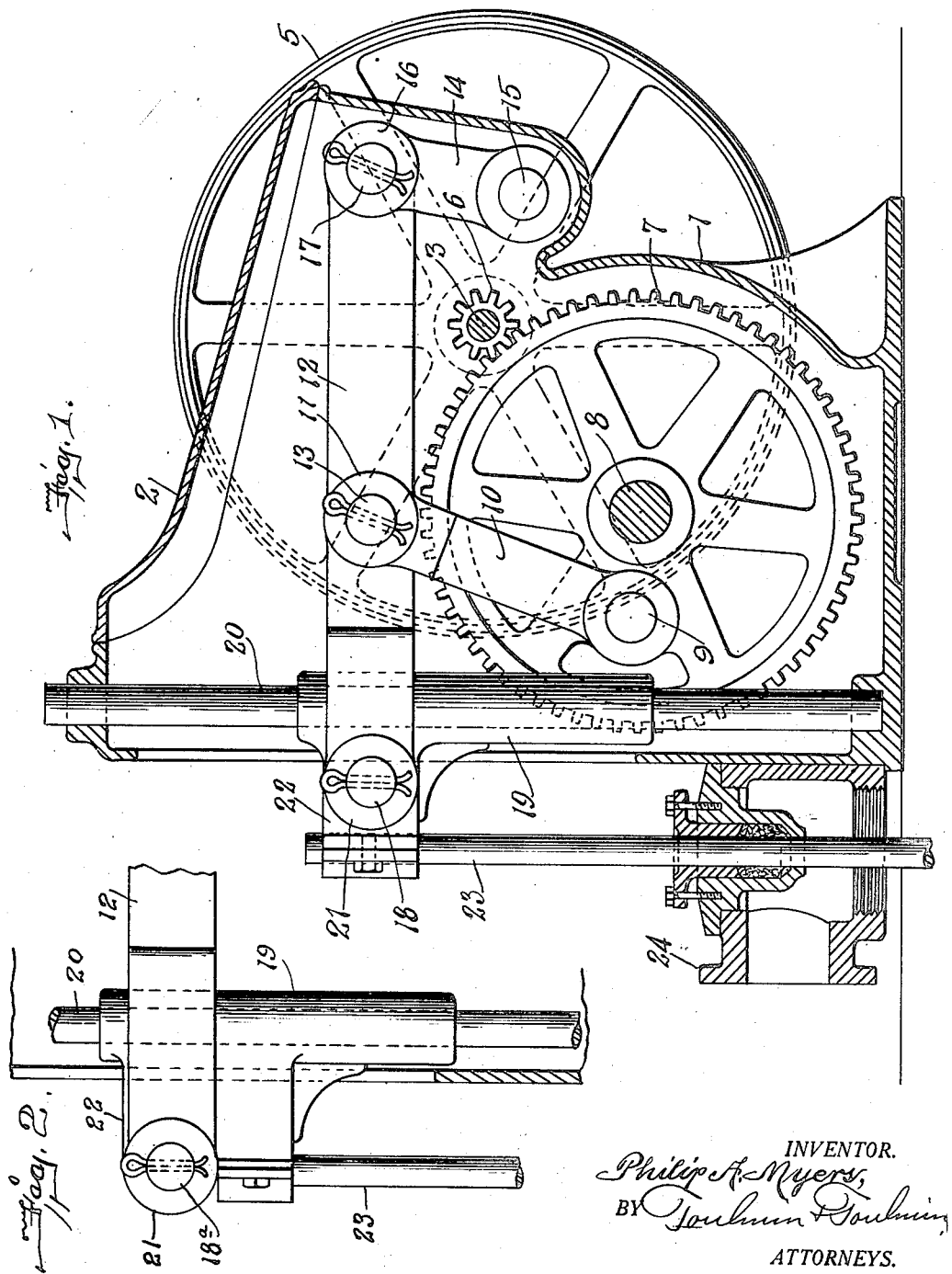

1,473,861

UNITED STATES PATENT OFFICE.

PHILIP A. MYERS, OF ASHLAND, OHIO, ASSIGNOR TO THE F. E. MYERS AND BROTHER COMPANY, OF ASHLAND, OHIO, A CORPORATION OF OHIO.

POWER HEAD.

Application filed September 1, 1921. Serial No. 497,653.

*To all whom it may concern:*

Be it known that I, PHILIP A. MYERS, a citizen of the United States, residing at Ashland, in the county of Ashland and State of Ohio, have invented certain new and useful Improvements in Power Heads, of which the following is a specification, reference being had therein to the accompanying drawing.

This invention relates to improvements in power heads for use in operating the piston or pumping rod of water pumps. Specifically, the invention is an improvement upon the invention set forth in my application, Ser. No. 413,022, filed Sept. 27th, 1920, in which there is described and illustrated a walking beam having a certain relation to the operating mechanism within the lubricant-containing casing.

The present invention relates to another arrangement of walking beam in combination with the casing and contained operative mechanism, and the present object is to apply the lifting power from the walking beam at a point over or substantially over the pump piston rod which is to be actuated, for the purpose of preventing any side thrust or deflection of movement from a right line on the part of the sliding member which acts to guide the rod also in a right line, as any side thrust to this sliding member will cause binding and wearing which, particularly in the case of large pumps imposing a heavy load to be lifted, will result in bending strains and in undue wear; these are avoided by such application of the lifting power.

And a further object is to give the walking beam where it connects with the sliding member a right line motion so that its line of travel will agree with that of the travel of the sliding member, which member receives motion from the operating mechanism and delivers it to the pump rod.

In the accompanying drawings:

Fig. 1 is a side elevation of a power head embodying my invention;

Fig. 2 is a modification showing the connection of the walking beam to the slide immediately over the piston rod;

Fig. 3 is a plan view thereof.

The numeral 1 designates a suitable casing adapted to contain a quantity of lubricant in which a part of the operating mechanism will be immersed, to thereby pick up the lubricant and deliver it to various other parts.

This casing not only forms a vessel within which the lubricant is contained but constitutes bearings for the operating mechanism. It also has a cover 2 by which it can be kept closed and the lubricant protected from dust and dirt.

A driving shaft 3 is mounted in suitable bearings in the casing and equipped with a loose belt pulley 4 and a tight belt pulley 5. This shaft 3 carries pinions 6 which mesh with driven gear wheels 7 mounted on stud shafts 8 which extend a short distance into the casing, as seen best in Fig. 3. A wrist pin 9 interconnects these gears and carries a pitman 10 whose upper end is bifurcated to form jaws 11 which embrace a walking beam 12 to which they are pivoted by a pin 13.

This walking beam is connected to the casing in a manner to permit of one end travelling vertically, while the other end is pivoted. The construction shown for this purpose consists of a link 14 pivoted at 15 to the casing and bifurcated at its upper end, as shown at 16 in Fig. 3, by which it is connected to the walking beam through a pin 17. It will be seen that when the pitman 10 reciprocates the walking beam will be raised and lowered at its free end where it is connected by means of a pin 18 to the sliding member 19, preferably in the form of a sleeve but not necessarily so, adapted to reciprocate on a suitable guide 20, in the nature of a shaft held in the casing. This end of the walking beam is bifurcated into members 21 to straddle the sleeve 19. A projection 22 of the sleeve is adapted for connection with a pump piston rod 23 which, in these drawings passes through a pump head 24 attachable to the casing and adapted to sustain the pump itself which hangs below.

It will be noted that the location of the pin 18, by which the sliding member and the walking beam are connected together, is between the piston rod and the guide for the sliding member. The effect of this is to prevent the walking beam exerting any side thrust to the sliding member when lifting against a heavy load, as in the case of large pumps, say pumps having a stroke of twenty-four inches, as an illustration. This is apparent from Fig. 1.

In Fig. 2 I have modified the arrangement to the extent of placing the connection by the pin 18ª of the walking beam with the sliding member at a point essentially over the piston rod. This also has the effect of preventing the load to be lifted from tending to cause any side thrust on the sliding member actuated by the walking beam.

In both forms the principle of applying the power to the sliding member by the walking beam to operate the rod and lift the load without causing any side thrust of the sliding member on its guide is carried into effect.

As the walking beam is pivoted at one end and travels in a right line at the other end, there must be a compensating means to permit of a slight longitudinal movement of the beam as it passes above and below a horizontal line running through its pivot 17. This means consists of the link 14 pivoted to the casing.

Thus it will be understood that as the mechanism causes the walking beam to work up and down by the action of the pitman, the link 14 will slightly oscillate on its center 15, while the other end of the walking beam travels in a vertical plane with the slide 19, whereby the pump rod is operated vertically.

This arrangement and construction set forth is cheaply made, is strong and durable and is effective and satisfactory in practice.

Having thus fully described my invention, what I claim as new and desire to secure by Letters Patent, is:—

1. In a power head, the combination with a casing adapted to contain a quantity of lubricant, of operating mechanism mounted therein, including a reciprocating member mounted in said casing, a walking beam connected to said member, to the operating mechanism and to the casing, to the latter by means of a compensating device which permits the walking beam to have slight longitudinal movement when undergoing vertical travel.

2. In a power head, the combination with a casing adapted to contain a quantity of lubricant, of operating mechanism mounted therein, including a reciprocating member also mounted therein, and a walking beam connected to said member and to said mechanism and a link pivotally connecting the walking beam to the casing.

3. In a power head, the combination with a casing adapted to contain a quantity of lubricant, of operating mechanism mounted therein, a vertical guide, a slidable member adapted to reciprocate thereon, a walking beam connected to said member, said three elements being also mounted in said casing, a pitman connected to said mechanism and to the walking beam, and a compensating connection between the walking beam and casing to allow a slight longitudinal movement when travelling with the reciprocating member.

4. In a power head, the combination with a casing adapted to contain a quantity of lubricant, of operating mechanism comprising a driving shaft with pinions, driven gears connected by a wrist pin, a pitman, a walking beam, a compensating link connecting it with the casing, a guide, a reciprocating member mounted on it and connected with the walking beam, and a suitable connection between said member and a piston rod.

5. In a power head, the combination of operating mechanism including a reciprocating member adapted to be connected to a pump rod, and a guide for such member, with a walking beam connected to said member between the guide and the point for attachment of the member to the rod, the walking beam being also connected to the operating mechanism and to a support.

6. In a power head, the combination of operating mechanism comprising a gearing, a walking beam, a connection between the gearing and the beam and a rod adapted for operation by the walking beam, such rod and such beam being connected near one end of the beam.

In testimony whereof, I affix my signature.

PHILIP A. MYERS.